United States Patent
Bae et al.

(10) Patent No.: US 9,422,415 B2
(45) Date of Patent: Aug. 23, 2016

(54) AMORPHOUS ARTIFICIAL MARBLE CHIP AND MANUFACTURING METHOD THEREOF

(71) Applicant: SCHEM CO., LTD., Chungcheongbuk-do (KR)

(72) Inventors: Ki Boong Bae, Sejong (KR); June Hyeong Lee, Sejong (KR)

(73) Assignee: SCHEM CO., LTD., Cheongwon-Gun, ChungCheongbuk-Do (KR)

( * ) Notice: Subject to any disclaimer, the term of this patent is extended or adjusted under 35 U.S.C. 154(b) by 4 days.

(21) Appl. No.: 14/119,292

(22) PCT Filed: May 7, 2013

(86) PCT No.: PCT/KR2013/003980
§ 371 (c)(1),
(2) Date: Nov. 21, 2013

(87) PCT Pub. No.: WO2014/046367
PCT Pub. Date: Mar. 27, 2014

(65) Prior Publication Data
US 2015/0166761 A1 Jun. 18, 2015

(30) Foreign Application Priority Data

Sep. 21, 2012 (KR) .................. 10-2012-0105122

(51) Int. Cl.
| | | |
|---|---|---|
| C04B 111/54 | (2006.01) |
| B29B 9/00 | (2006.01) |
| B32B 3/00 | (2006.01) |
| B32B 5/16 | (2006.01) |
| B32B 7/00 | (2006.01) |
| C08F 283/06 | (2006.01) |
| C08K 3/22 | (2006.01) |
| C04B 26/02 | (2006.01) |
| C04B 26/06 | (2006.01) |
| C04B 18/02 | (2006.01) |

(52) U.S. Cl.
CPC ................ C08K 3/22 (2013.01); C04B 18/022 (2013.01); C04B 26/02 (2013.01); C04B 26/06 (2013.01); *C04B 2111/545* (2013.01); *C08K 2003/2227* (2013.01)

(58) Field of Classification Search
None
See application file for complete search history.

(56) References Cited

FOREIGN PATENT DOCUMENTS

| KR | 1020080069780 | | 7/2008 |
| KR | 10-2011-0103227 | * | 9/2011 |
| WO | WO 2008/013345 A1 | * | 1/2008 |

OTHER PUBLICATIONS

Boong et al KR 10-2011-0103227 Machine Translation, Pub. Sep. 20, 2011, p. 1-7.*

* cited by examiner

*Primary Examiner* — Susannah Chung
*Assistant Examiner* — Robert T Butcher
(74) *Attorney, Agent, or Firm* — Hauptman Ham, LLP

(57) ABSTRACT

Provided are an amorphous artificial marble chip, an artificial marble using the same, and a manufacturing method of the amorphous artificial marble chip.

14 Claims, 2 Drawing Sheets

AMORPHOUS ARTIFICIAL MARBLE CHIP AND MANUFACTURING METHOD THEREOF

TECHNICAL FIELD

The present invention relates to an amorphous artificial marble chip, an artificial marble using the same, and a manufacturing method of making the amorphous artificial marble chip.

BACKGROUND ART

An artificial marble, which is commonly known as an artificial marble composite providing a texture of a natural marble, obtained by combining natural marble chips or a mineral with an acryl, an unsaturated polyester, an epoxy resin, and the like, and adding various additives, pigments, and the like, thereto, may be largely classified into an acrylic-based artificial marble and a polyester-based artificial marble. The artificial marble has been increasingly demanded as a material of various plates and interior due to properties such as excellent appearance, weatherability, and soft touch.

The artificial marble may have various colored marble chips added thereto in order to express a texture of a native rock; however, in the case of the marble chip, since a rotating knife cutter and a pulverizer are used on a predetermined calendered sheet to manufacture the chip, having a pulverized cross section formed therein, such that softness obtained from a circular shape and a natural property obtained from various circular sizes are not provided.

In order to manufacture the artificial marble so as to be similar to the native rock, a plurality of marble chips having various patterns and designs have been developed; however, the manufactured marble chips are not sufficient in obtaining effects as the same as the native rock.

Korean Patent Laid-Open Publication No. 10-2008-0069780 (Jul. 29, 2008) discloses a method of pre-treatment of chips for artificial marble, the method including: putting a plurality of artificial marble chips into an artificial marble compound, and then performing mixing, stirring and defoaming processes; removing an excess artificial compound in a mixture obtained by the previous step from the artificial marble chips using a sieve and forming a plurality of agglomerated composites obtained by solidifying the artificial marble chips together; and hardening the composites of the artificial marble chips sieved by a sieve in the previous step, wherein chips having non-uniform size and shapes are manufactured by this method.

However, in the above-described method of the pre-treatment of the chips for artificial marble, a large amount of compound is lost in the second process, and when less the compound has a low viscosity, less compound remains on a surface of the chip, such that a strength of the chip mass is not high as expected and is difficult to be controlled.

In the manufacturing method of the artificial marble chip known so far, the chip is added to a resin syrup, followed by stirring and crushing; however, the chip manufactured by the above-described manufacturing method has a uniform patterned size and shape.

However, in order to satisfy the various needs of consumers, research into an amorphous artificial marble chip not having a uniform pattern formed therein and an artificial marble having novel pattern rather than the existing pattern has been continuously developed.

DISCLOSURE

Technical Problem

The present inventors studied problems caused by the existing marble chips and found that an amorphous chip is capable of being manufactured by simple methods without pulverization, thereby completing the present invention.

An object of the present invention is to provide an amorphous artificial marble chip capable of expressing a natural texture as compared to the existing artificial marble chip to manufacture an artificial marble similar to a natural object.

In addition, another object of the present invention is to provide a manufacturing method of making an amorphous artificial marble chip having a natural texture and providing softness obtained from the amorphous shape and various shapes and sizes, and the amorphous artificial marble chip manufactured by the manufacturing method.

Further, another object of the present invention is to provide an artificial marble including the amorphous artificial marble chip.

Technical Solution

The present invention provides a manufacturing method of an amorphous artificial marble chip having a natural texture and providing softness obtained from the amorphous shape and various shapes and sizes, and the amorphous artificial marble chip manufactured by the manufacturing method.

In one general aspect, a manufacturing method of an amorphous artificial marble chip, the manufacturing method includes:

a) putting first pulverized marble chips in a reaction bath;

b) dropping a resin syrup into the reaction bath to form amorphous droplets spaced apart by a predetermined interval;

c) scattering second pulverized marble chips over the amorphous droplets;

d) hardening the amorphous droplets for the first pulverized marble chips and the second marble chips to adhere to the amorphous droplets; and e) removing the first pulverized marble chips and the second pulverized marble chips that do not adhere to the amorphous droplets after being hardened.

At the time of the dropping in step a), predetermined amount of power may be applied to the reaction bath horizontally with respect to a vertical direction to reciprocate the reaction bath or apply vibrations to the reaction bath.

At the time of the dropping in step a), the resin syrup may be dropped at a predetermined rate through a nozzle spaced apart by a predetermined interval from the reaction bath including the first pulverized marble chips.

The resin syrup may include an initiator in a content of 0.1 to 2.0 parts by weight based on 100 parts by weight of any one or two or more binders selected from an unsaturated polyester resin, a polyurethane resin, an epoxy resin, a brominated epoxyacrylate resin, a brominated epoxy-acrylate oligomer or an acrylic-based resin.

The initiator may be any one or a mixture of two or more selected from t-butylperoxybenzoate, t-butylperoxyisopropylcarbonate, t-butlperoxy-2-ethylhexynoate and 1,1,di-t-butylperoxy-3,3,5-trimethylcyclohexane.

The resin syrup may further include an inorganic filler in a content of 1 to 300 parts by weight based on 100 parts by weight of the binder.

The inorganic filler may be any one or a mixture of two or more selected from aluminum hydroxide, calcium hydroxide, silica, alumina, barium sulfate, magnesium hydroxide and an artificial marble waste paste.

The first pulverized marble chips and the second pulverized marble chips may be marble chips obtained by pulverizing an artificial marble manufactured by using any one or two or more binders selected from group consisting of an unsaturated polyester resin, a polyurethane resin, an epoxy resin, a brominated epoxyacrylate resin, a brominated epoxy-acrylate oligomer or an acrylic-based resin.

The first pulverized marble chips and the second pulverized marble chips may be applied in a sum content of 0.1 to 300 parts by weight based on 100 parts by weight of the resin syrup dropped.

An average diameter of the amorphous artificial marble chips in a length direction of a long side may be 0.1 to 2.5 cm, and an average diameter thereof in a width direction perpendicular to the length direction may be 0.1 to 10 mm.

In another general aspect, the present invention provides an amorphous artificial marble chip manufactured by the manufacturing method as described above and an artificial marble including the amorphous artificial marble chip manufactured by the manufacturing method as described above.

Advantageous Effects

The amorphous chip according to the present invention, which is manufactured by considering the difficulty in developing a natural object material, has an advantage that the amorphous shape easily found in a native rock is used to graft the marble easily accessible in daily life, such that the chip virtually expressing the amorphous natural texture and having the improved strength, durability and water tightness due to excellent processability may be manufactured.

The artificial marble including the amorphous chip according to the present invention may satisfy the modern human trying to access to the natural environment in urban center these days while providing a light weight and being easily processed as compared to a natural marble.

DESCRIPTION OF DRAWINGS

The above and other objects, features and advantages of the present invention will become apparent from the following description of preferred embodiments given in conjunction with the accompanying drawings, in which.

BEST MODE

Hereinafter, each configuration of the present invention will be described in detail.

In the present invention, an amorphous shape means that a material may be manufactured in various shapes rather than a specific shape.

In the present invention, a pulverized marble chip means a crushed chip obtained by pulverizing an artificial marble hardened by using a resin syrup.

A manufacturing method of an amorphous artificial marble chip according to an exemplary embodiment of the present invention, the manufacturing method may include:

a) putting first pulverized marble chips in a reaction bath;

b) dropping a resin syrup into the reaction bath to form amorphous droplets spaced apart by a predetermined interval;

c) scattering second pulverized marble chips over the amorphous droplets; d) hardening the amorphous droplets for the first pulverized marble chips and the second marble chips to adhere to the amorphous droplets; and d) removing the first pulverized marble chips and the second pulverized marble chips that do not adhere to the amorphous droplets after being hardened.

In the present invention, it is preferred that at the time of performing a hardening process in step d) above, the reaction bath is put into an oven as it is and then the hardening process is performed.

In addition, the manufacturing method in the present invention may further include: after the step c), dropping the resin syrup on the second pulverized marble chips to form second amorphous droplets and then scattering a third pulverized marble chips on the amorphous droplet, as needed.

Figure 3:
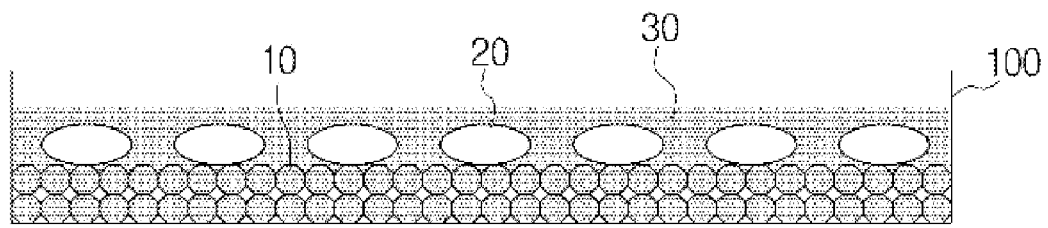
FIG. 3 shows a manufacturing method of making the amorphous artificial marble chip.

Referring to FIG. 3, FIG. 3 shows a cross section of the amorphous artificial marble chip obtained by performing the step a) to step c), wherein the amorphous artificial marble chip is manufactured by putting the first pulverized marble chips 10 into the reaction bath 100, dropping the resin syrup thereon to form the amorphous droplets 20, scattering the second pulverized marble chips 30 on the amorphous droplet to be applied on the surface of the amorphous droplet, and then performing a hardening process. Here, the first pulverized marble chips and the second pulverized marble chips not adhered to the syrup after being hardened may be removed by a method using a sieve. The removed first and second pulverized marble chips may be re-used as a raw material by a method using a sieve again.

In the exemplary embodiment of the present invention, a size of the first pulverized marble chip and the second pulverized marble chip may satisfy the following Equation 1:

Average Particle Size of Amorphous Droplet>Average Particle Size of First pulverized Marble Chip≥Average Particle Size of Second pulverized Marble Chip    [Equation 1]

That is, it is preferred that the average particle size of the amorphous droplet is larger than that of the first pulverized marble chips, and the average particle size of the first pulverized marble chips is the same as the average particle size of the second pulverized marble chips or the average particle size of the first pulverized marble chips is larger than that of the second pulverized marble chip. The first pulverized marble chips prevents the droplets from being adhered to the lower reaction bath, and serves to allow the first pulverized marble chips to be adhered to a low portion of the droplets. That is, when the droplets are dropped, falls down onto the first pulverized marble chips, and flows into a gap between the first pulverized marble chips, the first pulverized marble chips are applied into the reaction bath with a sufficient thickness and the second pulverized marble chips are applied on the droplets so that the flowing droplets are not adhered to the reaction bath, such that the second pulverized marble chips are uniformly applied up to a portion to which the first pulverized marble chips are not adhered, and therefore, at the time of dropping droplets thereon again, the dropping droplets are prevented from being adhered to the previously dropped droplets.

The average particle size of the droplets means a size of the amorphous droplets formed after falling down onto the first pulverized marble chips, and a diameter ($L_1$) in a length direction of a long side of the amorphous droplets and a diameter ($L_2$) at the widest position in a width direction perpendicular to the length direction, wherein the diameter with respect to the length direction of the long side means the longest diameter in the amorphous droplets.

The first pulverized marble chips and the second pulverized marble chips may have the same color and raw material as each other or different color and raw material from each other, and in order to provide various colors and patterns, the color and pattern may be changed and used by a person skilled in the art. In addition, the first pulverized marble chips and the second pulverized marble chips may be made of the same component as that of the resin syrup, or may be made of completely different components from that of the resin syrup. The pulverized marble chip is not limited but may be used as long as the chip is a chip obtained by pulverizing the artificial marble which is generally used in the art. More specifically, the marble chip may be a marble chip manufactured by crushing the artificial marble made of an unsaturated polyester resin, a polyurethane resin, an epoxy resin, a brominated epoxyacrylate resin, a brominated epoxy-acrylate oligomer or an acrylic-based resin.

In the exemplary embodiment of the present invention, at the time of dropping the resin syrup in step b) above, a predetermined amount of power may be applied to the reaction bath horizontally with respect to a vertical direction to reciprocate the reaction bath or apply vibrations to the reaction bath. In addition, at the time of dropping the resin syrup, a nozzle may be used, and a predetermined amount of power may be applied to the nozzle horizontally with respect to a vertical direction to reciprocate the nozzle or apply vibrations to the nozzle. In this case, the first pulverized marble chip and the second pulverized marble chips are easily adhered to the droplet, thereby being agglomerated in the amorphous shape rather than a specific shape. At the time of dropping the resin syrup, the nozzle may be used, but the present invention is not limited thereto. In addition, the reciprocation and the vibrations are not limited as long as they are usable in the art.

In the exemplary embodiment of the present invention, at the time of dropping the resin syrup in step b), it is preferred to drop the resin syrup in a predetermined rate through the nozzle spaced apart by a predetermined interval from the reaction bath including the first pulverized marble chips, and the nozzle is used to drop the resin syrup, such that a number of amorphous chips separated from each other may be manufactured, which is preferred.

Since a number of amorphous chips physically separated from each other needs to be included in a slurry for preparing the artificial marble at the time of manufacturing the artificial marble, the average diameter of the amorphous chip of the present invention is preferred to be controlled, and more specifically, the average diameter of the amorphous artificial marble chips in a length direction of a long side may be 0.1 to 2.5 cm, and an average diameter thereof in a width direction thereof perpendicular to the length direction may be 0.1 to 10 mm.

In the present invention, in order to control the average diameter of the amorphous artificial marble chips in the length direction of the long side to be 0.1 to 2.5 cm, a viscosity of the resin syrup is preferably controlled, and in order to control the viscosity, an inorganic filler is preferably additionally included. Here, in the case in which the viscosity is 5,000 to 200,000 cps (25° C.), the droplet does not fall down into an empty space formed between the first pulverized marble chips to prevent the droplet from being adhered to the reaction bath, which is preferred to manufacture the amorphous chip.

The resin syrup in the exemplary embodiment of the present invention is not limited as long as the resin syrup is a resin composition generally used in the art.

More specifically, the resin syrup may include an initiator in a content of 0.1 to 2.0 parts by weight based on 100 parts by weight of any one or two or more binders selected from an unsaturated polyester resin, a polyurethane resin, an epoxy resin, a brominated epoxyacrylate resin, a brominated epoxyacrylate oligomer or an acrylic-based resin.

Any one or two or more binders selected from an unsaturated polyester resin, a polyurethane resin, an epoxy resin, a brominated epoxyacrylate resin, a brominated epoxy-acrylate oligomer or an acrylic-based resin may be used for control specific gravity and interface adhesion strength of the chip, and preferably, the unsaturated polyester resin may be used.

More specifically, the exemplary embodiment of the resin syrup will be described below.

In the exemplary embodiment of the present invention, the resin syrup may include any one or two or more binders selected from an unsaturated polyester resin, a polyurethane resin, an epoxy resin, a brominated epoxyacrylate resin, a brominated epoxy-acrylate oligomer or an acrylic-based resin.

The unsaturated polyester resin may be manufactured by polycondensing a maleic acid in a content of 10 to 30 wt %, propylene glycol in a content of 5 to 20 wt %, ethylene glycol in a content of 1 to 10 wt %, diethylene glycol in a content of 7 to 15 wt % with a phthalic acid in a content of 10 to 30 wt % at a temperature of 210° C. for 18 hours and adding styrene monomer in a content of 20 to 60 wt % as a reactive diluent thereto to be diluted. Here, a weight average molecular weight thereof may be 1500 to 5000.

Examples of the conventional unsaturated polyester-based resin syrups include ATM-161H and SC-920 manufactured by Aekyung Chemical Co., Ltd., (Korea) and Polymaster MC-801 manufactured by Samhwa Paints Industrial Co., Ltd., (Korea).

The brominated epoxyacrylate or the brominated epoxy-acrylate oligomer is not specifically limited as long as it is the brominated epoxyacrylate, and any brominated epoxy-acrylate manufactured by the general method in the art may be used. The brominated epoxyacrylate or the brominated epoxy-acrylate oligomer used in the present invention may have a viscosity of 175±50 poise (25° C.) and a weight average molecular weight of 500 to 3000.

In addition, the resin syrup may include the initiator in a content of 0.1 to 2.0 parts by weight based on 100 parts by weight of the binder. The initiator may be used without limitation as long as it is a peroxide-based initiator, and more specifically, the initiator may be any one or a mixture of two or more selected from t-butylperoxybenzoate, t-butylperoxy-isopropylcarbonate, t-butylperoxy-2-ethylhexynoate and 1,1,di-t-butylperoxy-3,3,5-trimethylcyclohexane. In order to improve hardenability, in the case of using the initiator obtained by mixing di(4-tertiary-butylcyclohexyl)peroxydicarbonate and tertiary-butylperoxy-2-ethylhexanoate in a 1:1 weight ratio, excellent hardenability may be achieved. More specifically, the initiator obtained by mixing di(4-tertiary-butylcyclohexyl)peroxydicarbonate and tertiary-butylperoxy-2-ethylhexanoate in a 1:1 weight ratio may be included in a content of 0.1 to 2 parts by weight.

In the exemplary embodiment of the present invention, the resin syrup may further include the inorganic filler in a content of 1 to 300 parts by weight, and more specifically, 20 to 220 parts by weight, based on 100 parts by weight of the binder. As the inorganic filler, any one or a mixture of two or more selected from aluminum hydroxide, calcium hydroxide, silica, alumina, barium sulfate, magnesium hydroxide, and an artificial marble waste paste may be used. In the case in which the inorganic filler is used in a content less than 1 part by weight, since the marble chip has a light specific gravity, the marble chips may float to the top of the syrup at the time of manufacturing the artificial marble, and defect that the marble chips are adhered to each other may occur, and in the case in which the inorganic filler is used in a content more than 300 parts by weight, foam in the amorphous chips may occur.

In the case in which the used inorganic filler has the average particle size of 1 to 100 μm, the artificial marble uniformly dispersed in the inorganic filler may be manufactured, and more preferably, the average particle size of the inorganic filler may be 1 to 100 μm. In addition, in the case in which the average particle size of the inorganic filler is 1 to 100 μm, at the time of manufacturing the chip, the specific gravity may be controlled, and transparency by the inorganic filler may be prevented from being deteriorated. As the inorganic filler, HWF-10 manufactured by Shandong Aluminum Company (China), and the like, may be used.

In the present invention, the resin syrup may further include conventionally other additives such as cross-linking agents, colorants, coupling agents, pearl, UV stabilizers in addition to the above-described components. The additive is preferred to be used within a range in which physical properties of the amorphous chip are not deteriorated.

The resin syrup of the exemplary embodiment of the present invention may include the cross-linking agent, as needed, wherein as the cross-linking agent, tetraethylene glycol dimethacrylate, 1,6-hexanediol dimethacrylate, poly-butylene glycol, ethylene glycol dimethacrylate, diethylene glycol dimethacrylate, or triethylene glycol dimethacrylate may be used alone or two or more kinds thereof.

The resin syrup of the exemplary embodiment of the present invention may include the colorant added thereto, as needed, wherein as the colorant, any one or more selected from generally used organic/inorganic pigment, that is, the conventional pigment used in the art, for example, reddish-brown pigments such as iron oxide, low pigments such as iron hydroxide, green pigments such as chrome oxide, ultramarine pigments such as sodium aluminosilicate, white pigments such as titanium oxide, and the like, may be used. In addition, for excellent dispersibility, a toner prepared by adding the pigment thereto may be used, wherein the pigment is preferred to be used in the range in which the transparency is not deteriorated.

The resin syrup of the exemplary embodiment of the present invention may include the pearl, wherein the pearl is not limited as long as the conventional metal pearl powder is used. In the case of adding the pearl to the resin syrup, a shining effect may be provided.

In the resin syrup of the exemplary embodiment of the present invention, a coupling agent such as a silicate anhydride or surfactant may be further added thereto. In the case in which the coupling agent or the surfactant may be added, the coupling agent or the surfactant may improve adhesion strength between the inorganic filler and the resin or adhesion strength between the pigment and the resin. As the coupling agent, a fumed silica such as AROSIL RY 200 manufactured by DEGUSSA may be used. As the surfactant, any one or more selected from an anionic surfactant or non-ionic surfactant may be used.

The resin syrup of the exemplary embodiment of the present invention may further include a UV stabilizer, wherein the UV stabilizer may be used without limitation as long as it is used in the art, for example, Tinuvin-P manufactured by CIBA Company may be used.

When specifically explaining the manufacturing method of the present invention, the resin syrup is prepared, a vacuum defoaming is performed, the droplet drops into the reaction bath including the first pulverized marble chips through the nozzle, wherein the amorphous droplet falls down onto the marble chip while the reaction bath is reciprocated by a pre-determined amount of power, and then the droplet is covered by scattering the second pulverized marble chips thereon. Here, a size of the first pulverized marble chip may be 0.01 to 3 mm, the average diameter of the amorphous droplet in the length direction of the long side may be 0.1 to 2.5 cm, and the average diameter thereof in the width direction perpendicular to the length direction may be 0.1 to 10 mm. Here, the second pulverized marble chips may be applied in an amount sufficient for completely covering the surface of the droplet, and more specifically, the second pulverized marble chip may be applied so that a thickness thereof is 1 to 10 mm.

Figure 4:
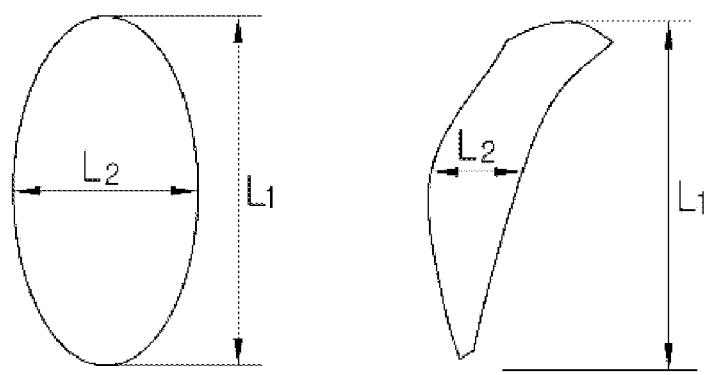
FIG. 4 shows a diameter L1 of the amorphous artificial marble chip in a length direction of a long side and a diameter L2 of the amorphous artificial marble chip in a width direction perpendicular to the length direction.

The average particle size of the droplet means a size of the amorphous droplet formed after the droplet falls down onto the first pulverized marble chips through the nozzle, and as shown in FIG. 4, the average particle size of the droplet means a diameter ($L_1$) in a length direction of a long side of the amorphous droplet and a diameter ($L_2$) at the widest position in a width direction perpendicular to the length direction, wherein the diameter with respect to the length direction of the long side means the longest diameter in the amorphous droplet.

In order to prevent a predetermined shake in the nozzle having a predetermined size and adhesion between the chips in the present invention, it is preferred to be applied on the marble chips having uniform size.

Scattering the pulverized chips having the average particle size of 0.01 to 3 mm is to form an applied layer obtained by uniformly applying the pulverized chips having the average particle size of 0.01 to 3 mm on the surface of the syrup configuring the amorphous chip, and as a result, the non-uniform chips are formed and the adhesion between the amorphous chips is prevented, whereby the amorphous chip having a natural texture and providing softness obtained from the amorphous shape and various shapes and sizes may be manufactured.

Therefore, the resin syrup is sprayed on the pulverized marble chips by a combination of the resin syrup and a filler to slowly form an applied layer on the pulverized marble chip, such that the amorphous chip is formed, which provides an important meaning to the present invention.

In the amorphous artificial marble chip, the first pulverized marble chips and the second pulverized marble chips may have a sum content of 0.1 to 300 parts by weight based on 100 parts by weight of the resin syrup dropped, and in the above-described range, the adhesion between the chips may be prevented and the amorphous chips may be easily manufactured.

In the present invention, the hardening is to harden the applied amorphous chip, wherein the second pulverized marble chips are applied onto the amorphous droplet, and the hardening is preferably performed at a temperature of 50 to 180° C. for a predetermined time.

In the present invention, the amorphous chip manufactured as described above is used to mix a slurry for manufacturing the artificial marble, and molding and hardening processes are performed to provide the artificial marble capable of expressing the natural texture such as the natural marble. Here, the slurry for manufacturing the artificial marble may be used in a combination generally used in a manufacturing field of the artificial marble.

The amorphous artificial marble chip manufactured by the manufacturing method of the present invention may be manufactured so that the average diameter of the amorphous artificial marble chips in a length direction of a long side is 0.1 to 2.5 cm, and an average diameter thereof in a width direction perpendicular to the length direction is 0.1 to 10 mm. The artificial marble having the same pattern as the natural marble may be manufactured in the above-described range.

The present invention may be specifically appreciated by the following exemplary embodiments, and the exemplary embodiments are given by way of illustration but are not intended to limit the protective scope defined by the attached claims of the present invention.

1) Average Diameter of Amorphous Chip

An average diameter of the manufactured amorphous chip was measured by measuring the longest length ($L_1$) of a long side of the amorphous chip and the widest length ($L_2$) in a width direction and calculating an average value as shown in FIG. 4.

In calculating the average value, a sieve having an inner length of 10 mm was used to select samples, and then the average value of thirty samples not passed through the sieve was calculated.

Example 1

Manufacture of Amorphous Chip

Based on 100 parts by weight of unsaturated polyester (Polymaster MC-801 manufactured by Samhwa Paints Industrial Co., Ltd., degree of unsaturation: 25%, weight-average molecular weight: 3,500) binder as a binder for manufacturing the amorphous chip, an initiator in 0.2 parts by weight obtained by mixing di(4-tertiary-butylcyclohexyl)peroxydicarbonate (Perkadox 16 manufactured by Akzo Nobel Company), tertiary-butylperoxy-2-ethylhexanoate (Trigonox 21 manufactured by Akzo Nobel Company) in 1:1 weight ratio and aluminum hydroxide (HWF-10 manufactured by Shandong Aluminum Company (China), average particle size: 10 μm) in 180 parts by weight were used to prepare a resin syrup. A viscosity of the prepared resin syrup was 50,000 cps (25° C.).

First pulverized marble chips obtained by pulverizing an artificial marble by using a pulverizer (PF-10 manufactured by Sam-a Engineering), the first pulverized marble chip having an average diameter of 0.4 mm, were prepared in a reaction bath so as to have a thickness of 3 mm.

The prepared resin syrup was dropped into the reaction bath through a nozzle, and a distance between the nozzle and the reaction bath was controlled so that the diameter in a length direction of a long side of a falling droplet is 2.5 cm or less, and a diameter thereof in a width direction perpendicular to the length direction is 5 mm or less. In addition, reciprocation was horizontally performed at a rate of 50 rpm in the reaction bath.

Second pulverized marble chips having an average particle size of 0.4 mm were applied thereon, such that the chip was applied on the surface of the resin syrup.

Figure 1:
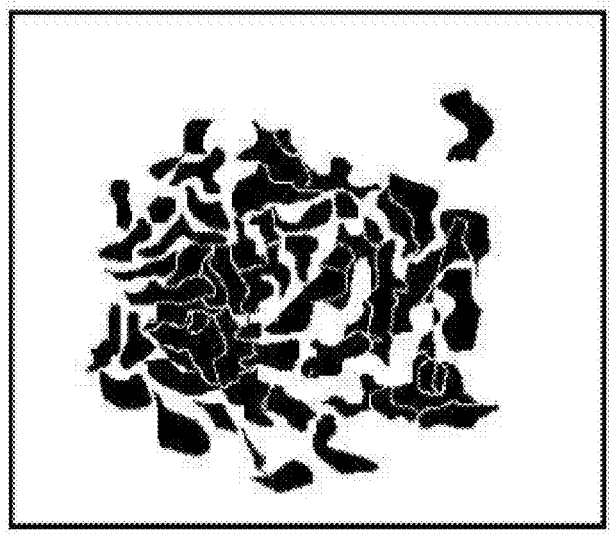
FIG. 1 is a photograph showing an exemplary embodiment of an amorphous artificial marble chip according to the present invention.

Then, the reaction bath was put into an oven as it is, and then hardened by raising a temperature to be 120° C. The amorphous chip having the first pulverized marble chip and the second pulverized marble chip applied on the surface of the resin syrup was cooled at a temperature 30° C. to obtain an amorphous chip, wherein an average diameter of the amorphous chip in a length direction of a long side is 2.0 cm, an average diameter thereof in a width direction perpendicular to the length direction is 4 mm. A photograph of the manufactured chip was shown in FIG. 1. As shown in FIG. 1, the amorphous chip was manufactured.

Manufacture of Artificial Marble

Based on 100 parts by weight of methylmethacrylate syrup including polymethylmethacrylate (IH830 manufactured by LG MMA Company (Korea), fluidity: 2.2 g/10 min·230° C./3.8 kg) in 25 wt % and methylmethacrylate (MMA manufactured by LG MMA Company, weight average molecular weight: 100.12) in 75 wt %, the manufactured amorphous chip in 100 parts by weight, aluminum hydroxide (HWF-10 manufactured by Shandong Aluminum Company (China), average particle size: 10 μm) in 160 parts by weight, trimethylpropanetrimethacrylate in 1.5 parts by weight, lauroyl peroxide in 1.5 parts by weight, hydroxylethylmethacrylate acid phosphate in 2.0 parts by weight as phosphate-based coupling agent were mixed to prepare an artificial marble slurry.

The slurry was put in a molding cell having a size of 300×300×15 mm and moved into a hot-air oven, and then hardened by raising a temperature of the oven up to 80° C. After the hardening process was completed, the slurry was cooled up to a room temperature and a surface thereof was polished to manufacture an artificial marble having a flat shape. A photograph of the manufactured artificial marble was shown in FIG. 2.

Figure 2:
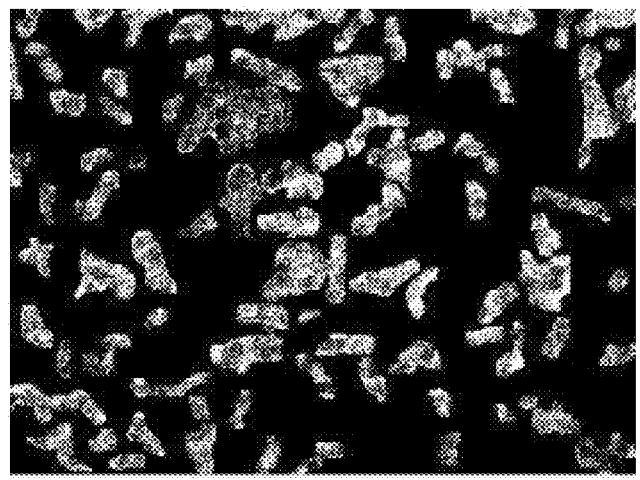
FIG. 2 is a photograph showing an exemplary embodiment of an artificial marble including the amorphous artificial marble chip.

It could be appreciated from FIG. 2 that the artificial marble having an amorphous pattern obtained by the amorphous chip was manufactured, and the artificial marble had natural color and pattern due to the color and the size of the first pulverized marble chip and the second pulverized marble chip applied on the surface of the amorphous chip.

Example 2

Manufacture of Amorphous Chip

Based on 100 parts by weight of a binder obtained by mixing unsaturated polyester (MC-801 manufactured by Samhwa Paints Industrial Co., Ltd.) binder in 50 parts by weight and a methylmethacrylate syrup in 50 parts by weight including polymethylmethacrylate (IH830 manufactured by LG MMA Company (Korea), fluidity: 2.2 g/10 min·230° C./3.8 kg) in 25 wt % and methylmethacrylate (MMA manufactured by LG MMA Company, weight average molecular weight: 100.12) in 75 wt % as a binder for manufacturing an amorphous chip, an initiator in 0.2 parts by weight obtained by mixing di(4-tertiary-butylcyclohexyl)peroxydicarbonate (Perkadox 16 manufactured by Akzo Nobel Company), tertiary-butylperoxy-2-ethylhexanoate (Trigonox 21 manufactured by Akzo Nobel Company) in 1:1 weight ratio and aluminum hydroxide (HWF-10 manufactured by Shandong Aluminum Company (China), average particle size: 10 μm) in 180 parts by weight as a filler were used to prepare a resin syrup. A viscosity of the prepared resin syrup was 30,000 cps (25° C.).

First pulverized marble chips obtained by pulverizing an artificial marble by using a pulverizer (PF-10 manufactured by Sam-a Engineering), the first pulverized marble chip having an average diameter of 0.4 mm, was prepared in a reaction bath so as to have a thickness of 3 mm.

The prepared resin syrup was dropped into the reaction bath through a nozzle, and a distance between the nozzle and the reaction bath was controlled so that the diameter in a length direction of a long side of a falling droplet is 2.5 cm or less, and a diameter thereof in a width direction perpendicular to the length direction is 5 mm or less. In addition, reciprocation was horizontally performed at a rate of 50 rpm in the reaction bath.

Second pulverized marble chips having an average particle size of 0.4 mm were applied thereon, such that the chip was applied on the surface of the resin syrup.

Then, the reaction bath was put into an oven as it is, and then hardened by raising a temperature to be 120° C. The amorphous chip having the first pulverized marble chip and the second pulverized marble chip applied on the surface of the resin syrup was cooled at a temperature 30° C. to obtain an amorphous chip, wherein an average diameter of the amorphous chip in a length direction of a long side is 2.0 cm, an average diameter thereof in a width direction perpendicular to the length direction is 4 mm.

An artificial marble of Example 2 was manufactured by the same method as the Example 1 above.

Example 3

Manufacture of Amorphous Chip

Based on 100 parts by weight of a methylmethacrylate syrup including polymethylmethacrylate (IH830 manufactured by LG MMA Company (Korea), fluidity: 2.2 g/10 min·230° C./3.8 kg) in 25 wt % and methylmethacrylate (MMA manufactured by LG MMA Company, weight average molecular weight: 100.12) in 75 wt % as a binder for manufacturing an amorphous chip, an initiator in 0.2 parts by weight obtained by mixing di(4-tertiary-butylcyclohexyl) peroxydicarbonate (Perkadox 16 manufactured by Akzo Nobel Company), tertiary-butylperoxy-2-ethylhexanoate (Trigonox 21 manufactured by Akzo Nobel Company) in 1:1 weight ratio and aluminum hydroxide (HWF-10 manufactured by Shandong Aluminum Company (China), average particle size: 10 μm) in 180 parts by weight as a filler were used to prepare a resin syrup. A viscosity of the prepared resin syrup was 60,000 cps (25° C.).

First pulverized marble chips obtained by pulverizing an artificial marble by using a pulverizer (PF-10 manufactured by Sam-a Engineering), the first pulverized marble chip having an average diameter of 0.4 mm, were prepared in a reaction bath so as to have a thickness of 3 mm.

The prepared resin syrup was dropped into the reaction bath through a nozzle, and a distance between the nozzle and the reaction bath was controlled so that the diameter in a length direction of a long side of a falling droplet is 2.5 cm or less, and a diameter thereof in a width direction perpendicular to the length direction is 5 mm or less. In addition, reciprocation was horizontally performed at a rate of 50 rpm in the reaction bath.

Second pulverized marble chips having an average particle size of 0.4 mm were applied thereon, such that the chip was applied on the surface of the resin syrup.

Then, the reaction bath was put into an oven as it is, and then hardened by raising a temperature to be 120° C. The amorphous chip having the first pulverized marble chip and the second pulverized marble chip applied on the surface of the resin syrup was cooled at a temperature 30° C. to obtain an amorphous chip through a sorting machine, wherein an average diameter of the amorphous chip in a length direction of a long side is 2.0 cm, an average diameter thereof in a width direction perpendicular to the length direction is 4 mm.

An artificial marble of Example 3 was manufactured by the same method as the Example 1 above.

The invention claimed is:

1. A manufacturing method of making an amorphous artificial marble chip, the manufacturing method comprising:
   a) putting first pulverized marble chips in a reaction bath;
   b) dropping a resin syrup into the reaction bath to form amorphous droplets spaced apart by a predetermined interval;
   c) scattering second pulverized marble chips over the amorphous droplets;
   d) hardening the amorphous droplets for the first pulverized marble chips and the second marble chips to adhere to the amorphous droplets; and
   e) removing the first pulverized marble chips and the second pulverized marble chips that do not adhere to the amorphous droplets after being hardened,
   wherein the first marble chips form a layer prohibiting the amorphous droplets from being adhered to a lower section of the reaction bath,
   wherein the first pulverized marble chips and the second pulverized marble chips are obtained by pulverizing an artificial marble,
   wherein the amorphous droplets have an average size greater than the average size of the first pulverized marble chips, and
   wherein the average size of the first pulverized marble chips is greater than or equal to the average size of the second pulverized marble chips.

2. The manufacturing method of claim 1, further comprising: after step c), dropping a resin syrup on the second pulverized marble chips to form second amorphous droplets and then scattering third pulverized marble chips over the second amorphous droplets.

3. The manufacturing method of claim 1, wherein at the time of the dropping in step b), a predetermined amount of power is applied to the reaction bath horizontally with respect to a vertical direction to reciprocate the reaction bath.

4. The manufacturing method of claim 1, wherein at the time of the dropping in step b), the resin syrup is dropped at a predetermined rate through a nozzle spaced apart by a predetermined interval from the reaction bath.

5. The manufacturing method of claim 1, wherein the resin syrup includes an initiator and any one or two or more binders, wherein the initiator is in a content of 0.1 to 2.0 parts by weight based on 100 parts by weight of any one or two or more binders and the one or two or more binders are selected from the group consisting of an unsaturated polyester resin, a polyurethane resin, an epoxy resin, a brominated epoxyacrylate resin, a brominated epoxy-acrylate oligomer and an acrylic-based resin.

6. The manufacturing method of claim 5, wherein the resin syrup further includes an inorganic filler in a content of 1 to 300 parts by weight based on 100 parts by weight of the binder.

7. The manufacturing method of claim 5, wherein the initiator is any one or a mixture of two or more selected from the group consisting of t-butylperoxybenzoate, t-butylperoxyisopropylcarbonate, t-butylperoxy-2-ethylhexynoate and 1,1,di-t-butylperoxy-3,3,5-trim ethylcyclohexane.

8. The manufacturing method of claim 6, wherein the inorganic filler is any one or a mixture of two or more selected from the group consisting of aluminum hydroxide, calcium hydroxide, silica, alumina, barium sulfate, magnesium hydroxide and an artificial marble waste paste.

9. The manufacturing method of claim 1, wherein the first pulverized marble chips and the second pulverized marble chips are marble chips obtained by pulverizing an artificial marble manufactured by using one or more binders selected from the group consisting of an unsaturated polyester resin, a polyurethane resin, an epoxy resin, a brominated epoxyacrylate resin, a brominated epoxy-acrylate oligomer or an acrylic-based resin.

10. The manufacturing method of claim 1, wherein the first pulverized marble chips and the second pulverized marble chips are applied in a sum content of 0.1 to 300 parts by weight based on 100 parts by weight of the resin syrup dropped in step b).

11. The manufacturing method of claim 1, wherein an average diameter of the amorphous artificial marble chips in a length direction of a long side is 0.1 to 2.5 cm, and an average diameter thereof in a width direction perpendicular to the length direction is 0.1 to 10 mm.

12. An amorphous artificial marble chip manufactured by the manufacturing method of claim 1.

13. An artificial marble including the amorphous artificial marble chip manufactured by the manufacturing method of claim 1.

14. The manufacturing method of claim 1, wherein the amorphous droplets have an average diameter in a length direction ranging from 0.1 to 2.5 cm and an average diameter in a width direction perpendicular to the length direction ranging from 0.1 to 10 mm, and the first pulverized marble chips and the second pulverized marble chips have an average particle size ranging from 0.01 to 3 mm.

* * * * *